United States Patent
Tanouchi et al.

(10) Patent No.: US 11,353,846 B2
(45) Date of Patent: Jun. 7, 2022

(54) SERVO AMPLIFIER SELECTION DEVICE AND SERVO AMPLIFIER SELECTION COMPUTER PROGRAM

(71) Applicant: FANUC CORPORATION, Yamanashi (JP)

(72) Inventors: Hironao Tanouchi, Yamanashi (JP); Koujirou Sakai, Yamanashi (JP)

(73) Assignee: FANUC CORPORATION, Yamanashi (JP)

( * ) Notice: Subject to any disclaimer, the term of this patent is extended or adjusted under 35 U.S.C. 154(b) by 147 days.

(21) Appl. No.: 16/934,010

(22) Filed: Jul. 21, 2020

(65) Prior Publication Data

US 2021/0026326 A1    Jan. 28, 2021

(30) Foreign Application Priority Data

Jul. 23, 2019 (JP) .............................. JP2019-135558

(51) Int. Cl.
  *G05B 19/414* (2006.01)
(52) U.S. Cl.
  CPC ............. *G05B 19/4141* (2013.01); *G05B 2219/41002* (2013.01)
(58) Field of Classification Search
  CPC .................. G05B 19/4141; G05B 2219/41002

USPC ................................................ 318/625, 560
See application file for complete search history.

(56) References Cited

U.S. PATENT DOCUMENTS 6,744,233 B1 *  6/2004  Tsutsui .................... H02P 23/06
                                                           318/560

FOREIGN PATENT DOCUMENTS

JP              201957962 A      4/2019

* cited by examiner

*Primary Examiner* — David Luo
(74) *Attorney, Agent, or Firm* — Hauptman Ham, LLP

(57) ABSTRACT

A servo amplifier selection device includes a memory configured to store specifications of each of a plurality of amplifiers capable of supplying power to a motor; and a processor configured to select, based on the number of one or more designated motors, specifications of each of the one or more designated motors, and specifications of each of the plurality of amplifiers, a combination of amplifiers connected to the one or more designated motors from the plurality of amplifiers in such a way that each of the one or more designated motors is connected to any of the plurality of amplifiers; and select, for each amplifier included in the combination of the amplifiers, specifications of a power cable that connects between the amplifier and a power source in such a way as to satisfy a supply of power needed for the motor connected to the amplifier.

7 Claims, 8 Drawing Sheets

| AMPLIFIER TYPE | CABLE THICKNESS (FOR POWER SOURCE) [mm^2] |
|---|---|
| β iSV20-B | 0.75 OR GREATER |
| β iSV40/40-B | 1.25 OR GREATER |
| α iPS5.5-B | 5.5 OR GREATER |
| α iPS11-B | 8 OR GREATER |
| α iPS15-B | 14 OR GREATER |
| ⋮ | ⋮ |

300

| CABLE THICKNESS[mm^2] | MOTOR TYPE |
|---|---|
| 0.75 | αiF1/5000-B, βiS1/6000-B, ... βiS12/3000-B etc. |
| 1.25 | αiF8/4000-B, βiF22/2000-B, ... βiF30/1500-B etc. |
| 2 | αiF12/4000-B, βiS30/2000-B, ... βiS40/2000-B etc. |
| ... | ... |
| 8 | αiI8/8000-B etc. |
| ... | ... |

| CABLE THICKNESS[mm^2] | MOTOR COMBINATION |
|---|---|
| 1 | βiS1/6000-B×2 |
| 2.5 | αiF8/4000-B×2 |
| 4 | (αiF8/4000-B, αiF12/4000-B) |
| ... | ... |

600

| TOOL TYPE | PROCESSABLE CABLE THICKNESS |
|---|---|
| TOOL A | 0.75, 1.25 |
| TOOL B | 1.25, 2 |
| TOOL C | 1, 2, 4 |
| TOOL D | 2, 4, 8 |
| ⋮ | ⋮ |

700

SERVO AMPLIFIER SELECTION DEVICE AND SERVO AMPLIFIER SELECTION COMPUTER PROGRAM

RELATED APPLICATIONS

The present application claims priority to Japanese Application Number 2019-135558, filed Jul. 23, 2019, the disclosure of which is hereby incorporated by reference herein in its entirety.

FIELD

The present invention relates to a servo amplifier selection device and a servo amplifier selection computer program that select a cable for power transmission used in a system for driving a motor, for example.

BACKGROUND

A system for driving a motor such as a servo motor or a spindle motor is required to include a power supply facility capable of supplying sufficient power needed for the motor in order to appropriately drive the motor. However, it becomes more difficult to select an appropriate power supply facility as the number of motors to be driven is increased or a type of motors to be driven is increased. Thus, a technique for calculating the number of necessary amplifiers, based on motor model information needed for constructing a desired system, and selecting a necessary amplifier has been proposed (for example, see Japanese Unexamined Patent Publication (Kokai) No. 2019-57962).

SUMMARY

A facility that supplies power to a motor includes not only an amplifier, but also a cable being connected between a power source and the amplifier or between the amplifier and a motor, and used for transmitting power (hereinafter, also referred to as a power cable). Therefore, in a system for driving a motor, it is required to select an appropriate power cable.

In one aspect, an object is to provide a cable selection device capable of selecting an appropriate power cable in a system for driving a motor.

According to one embodiment, a servo amplifier selection device is provided. The servo amplifier selection device includes: a memory configured to store specifications of each of a plurality of amplifiers capable of supplying power to a motor; and a processor configured to select, based on the number of one or more designated motors, specifications of each of the one or more designated motors, and the specifications of each of the plurality of amplifiers, a combination of amplifiers connected to the one or more designated motors from the plurality of amplifiers in such a way that each of the one or more designated motors is connected to any of the plurality of amplifiers; and select, for each amplifier included in the combination of the amplifiers, specifications of a power cable that connects between the amplifier and a power source in such a way as to satisfy a supply of power needed for the motor connected to the amplifier among the one or more designated motors.

According to another embodiment, a non-transitory recording medium that stores a servo amplifier selection computer program is provided. The servo amplifier selection computer program causes a computer to execute: selecting, based on the number of one or more designated motors, specifications of each of the one or more designated motors, and specifications of each of a plurality of amplifiers capable of supplying power to the one or more designated motors, being stored in a memory, a combination of amplifiers connected to the one or more designated motors from the plurality of amplifiers in such a way that each of the one or more designated motors is connected to any of the plurality of amplifiers; and selecting, for each amplifier included in the combination of the amplifiers, specifications of a power cable that connects between the amplifier and a power source in such a way as to satisfy a supply of power needed for the motor connected to the amplifier among the one or more designated motors.

According to one aspect, an appropriate power cable in a system for driving a motor can be selected.

DESCRIPTION OF EMBODIMENTS

Hereinafter, a servo amplifier selection device and a servo amplifier selection computer program operating in the servo amplifier selection device will be described with reference to the drawings. The servo amplifier selection device selects, based on the number of motors used for constructing a desired system, specifications of an individual motor, and specifications of each of a plurality of selectable amplifiers, a combination of amplifiers for supplying power to the motors. Then, the servo amplifier selection device selects, based on the selected combination of the amplifiers, specifications (for example, a thickness of a power cable) required for each of a power cable that connects between an individual amplifier included in the combination and a power source and a power cable that connects between an individual motor and the amplifier. In this way, the servo amplifier selection device can appropriately select a power cable used in the desired system. Further, the servo amplifier selection device selects a tool suitable for processing a power cable of selected specifications, in accordance with specifications of each of the selected power cables by referring to a table representing a relationship between specifications of a power cable and a tool usable for processing the power cable of the specifications.

Figure 1:
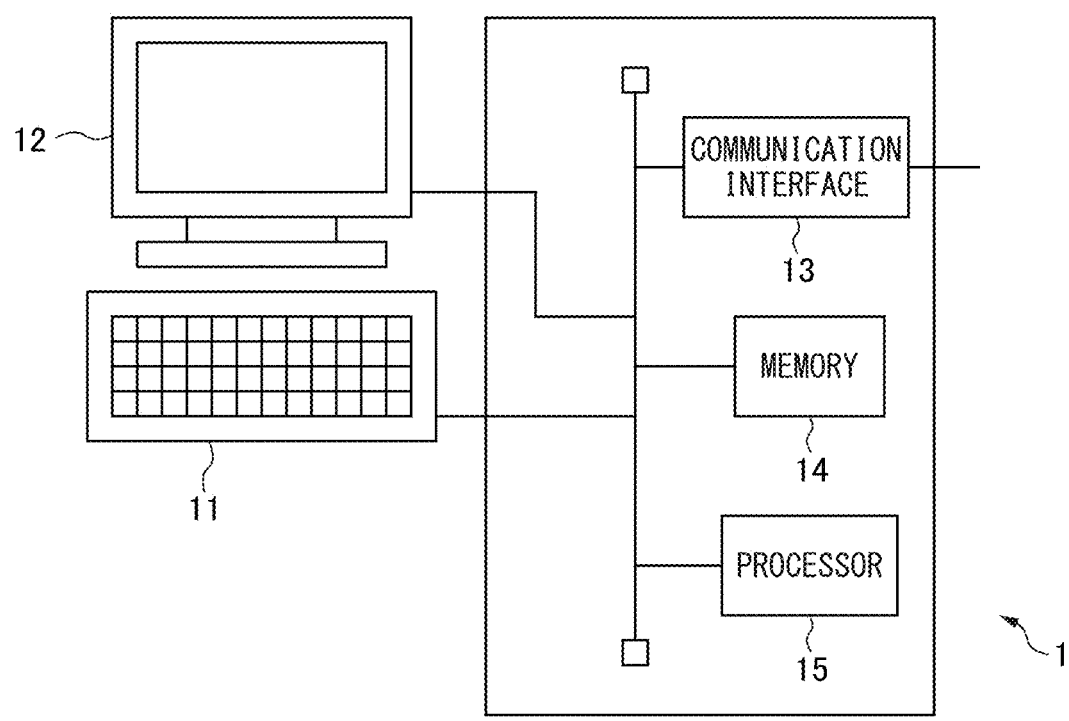
FIG. 1 is a schematic configuration diagram of a cable selection device according to one example of a servo amplifier selection device.

FIG. 1 is a schematic configuration diagram of the cable selection device according to one example of a servo amplifier selection device. A cable selection device 1 includes an input device 11, a display device 12, a communication interface 13, a memory 14, and a processor 15.

The input device 11 is one example of an input unit, and includes an input instrument such as a keyboard or a mouse for operation signal input, for example. Then, the input device 11 generates an operation signal in response to an operation by a user, and outputs the generated operation signal to the processor 15.

In the present embodiment, when cable selection processing starts, information about a motor being used, such as the number of motors used for constructing a desired system, a type (for example, a servo motor or a spindle motor) of an individual motor, and specifications of the individual motor (hereinafter, simply referred to as used motor information for convenience of description), is input via the input device 11. Note that the desired system can be any of various systems operating by using a motor, such as a machine tool, a robot, a production facility, or the like, for example. Further, the specifications of the individual motor include, for example, power consumption, a rated current, a size, or the like of the motor. Then, the input device 11 generates an operation signal representing the input used motor information, and outputs the generated operation signal to the processor 15.

Furthermore, restriction information representing a restricting condition for selecting an amplifier may be input via the input device 11 in the cable selection processing. The restriction information includes, for example, a size of an installation place of an amplifier, an upper limit of an acquisition cost of an amplifier, or the like. Then, the input device 11 generates an operation signal including the restriction information, and outputs the generated operation signal to the processor 15.

The display device 12 is one example of a display unit, and includes, for example, a display device such as a liquid crystal display or an organic electro-luminescence display. Then, the display device 12 displays information representing a type or form of a selected individual amplifier, specifications of a selected individual power cable (or physical characteristic corresponding to the specifications, and the like), a type of a selected tool, and the like, in response to a display signal received from the processor 15.

Note that the input device 11 and the display device 12 may be configured as an instrument integrally formed of an input instrument and a display device, such as a touch panel.

The communication interface 13 is another example of an input unit, and includes, for example, a communication interface for connecting the cable selection device 1 to another instrument, and the like. Then, for example, when the used motor information and the restriction information are input via the another instrument, the communication interface 13 passes, for example, the used motor information and the restriction information that are received from the another instrument to the processor 15. Further, the communication interface 13 may output, to the another instrument, information representing a type of a selected individual amplifier, specifications of a selected individual power cable, a type of a selected tool, and the like that are received from the processor 15 and are acquired as a result of the cable selection processing.

The memory 14 is one example of a storage unit, and includes, for example, a readable-writable semiconductor memory and a read-only semiconductor memory. Furthermore, the memory 14 may include a storage medium such as a semiconductor memory card, a hard disk, or an optical storage medium, and a device that accesses the storage medium.

The memory 14 stores various types of information used in the cable selection processing executed by the processor 15 of the cable selection device 1. Such information includes, for example, amplifier information representing specifications of each of a plurality of selectable amplifiers (for example, a type of a connectable motor, the number of connectable motors, an amplifier capacity, a size, and the like), and a table representing a relationship between specifications of a power cable (for example, a thickness of a cable, a continuous rated current value, and the like) and a usable amplifier (hereinafter, referred to as a cable table for convenience of description), a type of a usable motor, or a combination of motors. Furthermore, information used in the cable selection processing includes a table representing, for each selectable tool, specifications of a power cable that can be processed by using the tool (hereinafter, referred to as a tool table for convenience of description).

The processor 15 includes, for example, one or a plurality of central processing units (CPUs) and a peripheral circuit thereof. Furthermore, the processor 15 may include a processor for a logical operation and a processor for a numerical operation. Then, the processor 15 executes the cable selection processing to select a combination of amplifiers usable for one or more motors designated by used motor information, specifications of a power cable, and a tool.

Figure 2:
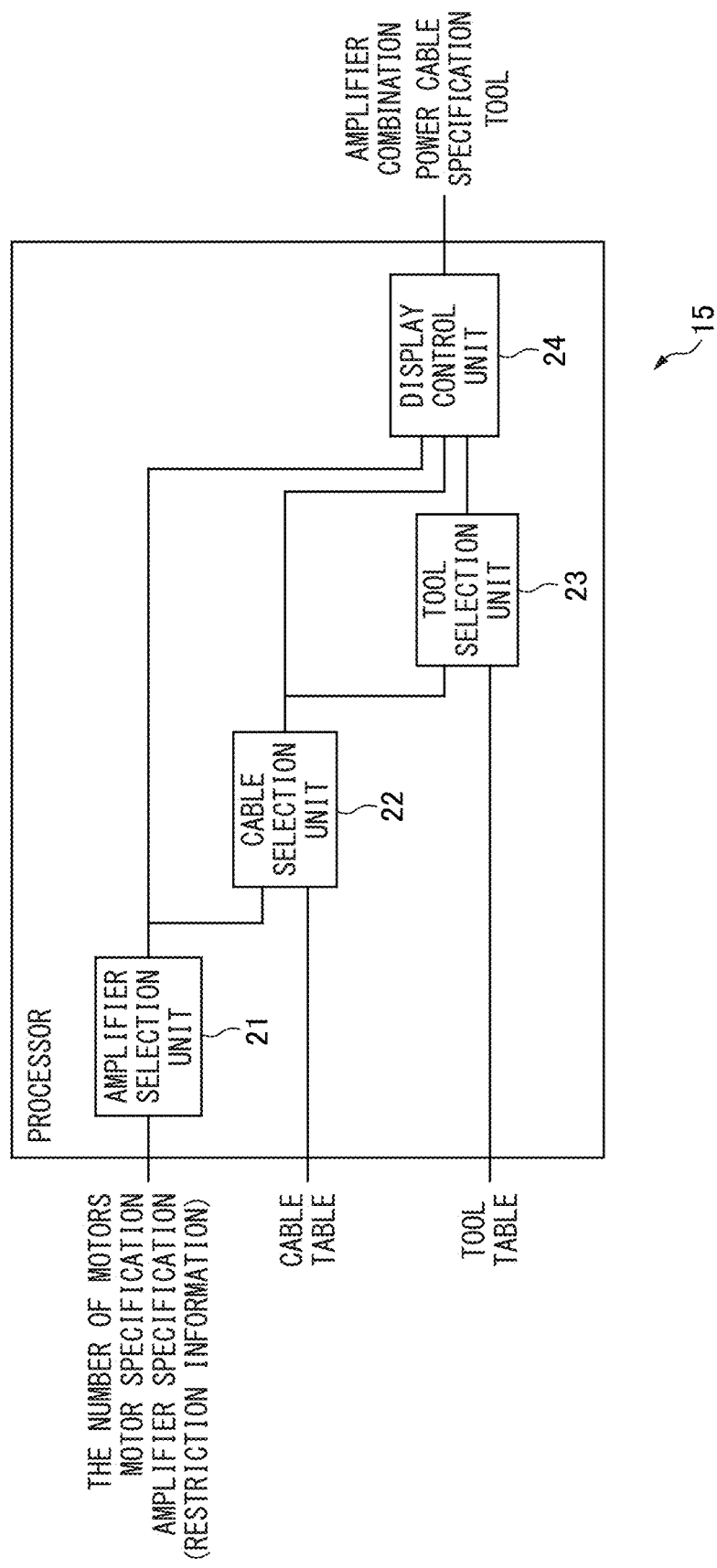
FIG. 2 is a functional block diagram of a processor of the cable selection device.

FIG. 2 is a functional block diagram of the processor 15, relating to the cable selection processing. The processor 15 includes an amplifier selection unit 21, a cable selection unit 22, a tool selection unit 23, and a display control unit 24. Each of the units included in the processor 15 is, for example, a functional module achieved by a computer program executed on the processor 15. Alternatively, each of the units may be mounted as a dedicated arithmetic circuit mounted on a part of the processor 15.

The amplifier selection unit 21 selects, from a plurality of selectable amplifiers, a combination of amplifiers that supply power to each motor in such a way that each motor is connected to any of the amplifiers in accordance with the number of motors, specifications of an individual motor designated by used motor information, and specifications of each of the amplifiers. For this purpose, the amplifier selection unit 21 selects a combination of amplifiers according to a technique similar to the technique disclosed in Japanese Unexamined Patent Publication (Kokai) No. 2019-57962, for example. In other words, the amplifier selection unit 21 refers to amplifier information, and determines, for each amplifier, a motor connected to the amplifier from one or more motors designated by the used motor information in such a way that the number of motors connected to the amplifier is equal to or less than a maximum number of motors connectable to the amplifier and a sum of power consumption of motors connected to the amplifier is equal to or less than an amplifier capacity of the amplifier. Then, the amplifier selection unit 21 selects a combination of amplifiers that supply power to each motor in such a way that all motors designated by the used motor information are connected to any of the amplifiers. In this case, the amplifier selection unit 21 may select a combination of amplifiers in such a way that the number of selected amplifiers is minimum, or may select a combination of amplifiers in such a way that a total of an amplifier capacity of each of selected amplifiers is minimum.

Furthermore, there is an amplifier in which a portion including an AC/DC converter that converts AC power from a power source into DC power (hereinafter, referred to as a power source unit) and a portion including an inverter that converts DC power into AC power for a supply to a motor (hereinafter, referred to as an inverter unit) are separated and selectable separately (hereinafter, referred to as a separation type amplifier for convenience of description). For such a separation type amplifier, the amplifier selection unit 21 may select the power source unit having an amplifier capacity greater than a sum of power consumption of an individual motor connected to the inverter unit.

Further, when restriction information is input, the amplifier selection unit 21 may select a combination of amplifiers in such a way as to satisfy a condition designated by the restriction information. For example, when a size of an installation place of an amplifier is included in the restriction information, the amplifier selection unit 21 selects a combination of amplifiers in such a way that a total of an installation size of an individual amplifier included in the selected combination of the amplifiers is equal to or less than the size of the installation place of the amplifier. Alternatively, when an upper limit of an acquisition cost of an amplifier is included in the restriction information, the amplifier selection unit 21 may select a combination of amplifiers in such a way that a total of an acquisition cost of an individual amplifier included in the selected combination of the amplifiers is equal to or less than the upper limit of the acquisition cost of the amplifier. Furthermore, when a margin value of an amplifier capacity for the separation type amplifier is included in the restriction information, the amplifier selection unit 21 may select the power source unit in such a way that a difference between a sum of power consumption of an individual motor connected to the inverter unit and the amplifier capacity of the power source unit is equal to or greater than the margin value.

In order to select a combination of amplifiers as described above, for example, the amplifier selection unit 21 may select a combination of amplifiers in accordance with a round-robin algorithm, or may select a combination of amplifiers in accordance with any of various optimization techniques used for optimizing a combination, such as dynamic programming or a genetic algorithm, for example.

The amplifier selection unit 21 notifies the cable selection unit 22 and the display control unit 24 of the selected combination of the amplifiers and, for an individual amplifier included in the selected combination of the amplifiers, a combination of motors connected to the amplifier.

The cable selection unit 22 selects, for the individual amplifier included in the selected combination of the amplifiers notified from the amplifier selection unit 21, specifications of a power cable used for connecting between the amplifier and a power source in such a way as to satisfy a supply of necessary power to a motor connected to the amplifier. Furthermore, the cable selection unit 22 selects, for each motor, specifications of a power cable used for connecting between the motor and the amplifier in such a way as to satisfy a supply of necessary power to the motor.

In the present embodiment, the cable selection unit 22 refers to a cable table for an individual amplifier included in a selected combination of amplifiers to select a thickness of a power cable corresponding to the amplifier as specifications of the power cable that connects between a power source and the amplifier. Further, the cable selection unit 22 refers to the cable table for each motor, and selects a thickness of a power cable corresponding to the motor as specifications of the power cable that connects between the motor and an amplifier.

Figure 3:
FIG. 3 is a diagram illustrating one example of a cable table used for selecting a power cable that connects between a power source and an amplifier.

FIG. 3 is a diagram illustrating one example of a cable table used for selecting specifications of a power cable that connects between a power source and an amplifier. The cable table 300 illustrated in FIG. 3 indicates, for each type of an amplifier, specifications of a power cable (i.e., a thickness of a power cable) usable for connecting between the amplifier and a power source. For example, in the cable table 300, for each amplifier, a thickness of a power cable that can transmit power corresponding to an amplifier capacity of the amplifier is associated with the amplifier. Further, regarding to a separation type amplifier, a power source unit and a thickness of a power cable are associated with each other. Therefore, by referring to the cable table 300 to specify a thickness of a power cable associated with the amplifier of interest, the cable selection unit 22 can select the thickness of the power cable used for connecting between the amplifier and a power source in such a way as to satisfy a power supply to each motor connected to the amplifier.

Figure 4:
FIG. 4 is a diagram illustrating one example of a cable table used for selecting a power cable that connects between a motor and an amplifier.

FIG. 4 is a diagram illustrating one example of a cable table used for selecting a power cable that connects between a motor and an amplifier. The cable table 400 illustrated in FIG. 4 indicates, for each thickness of a power cable, a motor corresponding to the thickness. For example, in the cable table 400, for each motor, a thickness of a power cable that can transmit power corresponding to power consumption of the motor is associated with the motor. Therefore, by referring to the cable table 400 to specify a thickness of a power cable associated with the motor of interest, the cable selection unit 22 can select the thickness of the power cable used for connecting between the motor and an amplifier.

Figure 5:
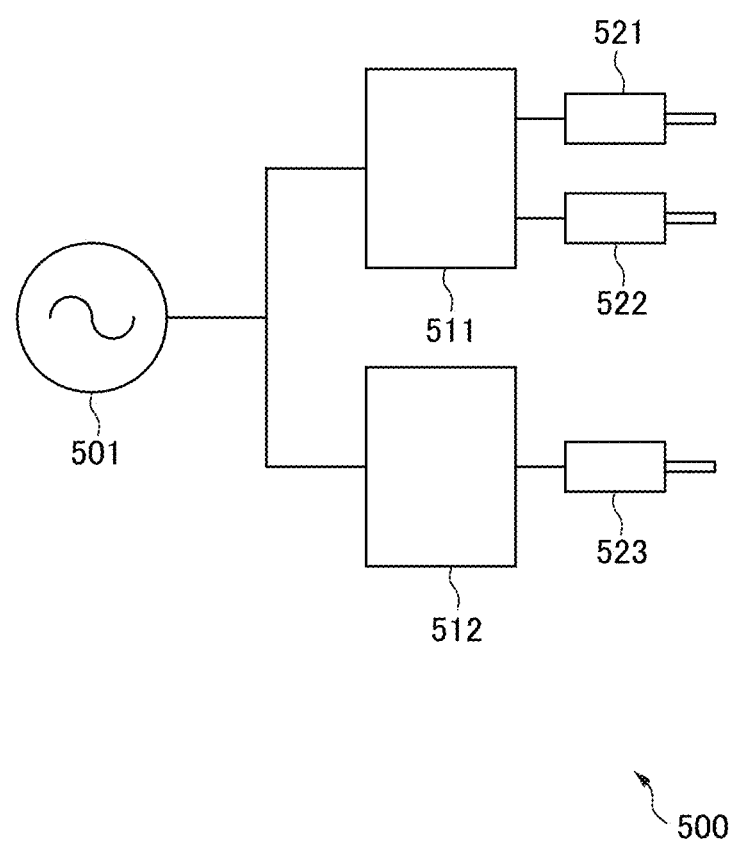
FIG. 5 is a diagram illustrating one example of a relationship between a motor connected to an individual amplifier included in a selected combination of amplifiers and a selected power cable.

FIG. 5 is a diagram illustrating one example of a relationship between a motor connected to an individual amplifier included in a selected combination of amplifiers and a selected thickness of a power cable.

In a system 500 for driving three motors 521 to 523 illustrated in FIG. 5, a combination of amplifiers is selected in such a way that two amplifiers 511 and 512 are connected in parallel to each other with respect to a power source 501, and the two motors 521 and 522 are connected to the amplifier 511 and one motor 523 is connected to the amplifier 512. Note that, in FIG. 5, for simplification, a power cable that connects between the individual amplifier and the power source and a power cable that connects between the individual motor and the amplifier are each indicated by one line regardless of an actual number. In this example, it is assumed that the amplifier 511 is an amplifier βiSV40/40-B registered in the cable table 300 illustrated in FIG. 3, and the amplifier 512 is a separation type amplifier and includes a power source unit αiPS11-B registered in the cable table 300. Further, it is assumed that the motors 521 and 522 are each βiF22/2000-B registered in the cable table 400 illustrated in FIG. 4, and the motor 523 is αiI8/8000-B registered in the cable table 400.

In this example, the cable selection unit 22 refers to the cable table 300 to specify a thickness of the power cable corresponding to the amplifier 511. Then, the cable selection unit 22 selects the specified thickness of the power cable as a thickness of the power cable that connects between the power source 501 and the amplifier 511. In this example, the amplifier 511 is βiSV40/40-B, and thus it is specified that a thickness of a usable power cable is 1.25 [mm$^2$]. Therefore, the cable selection unit 22 selects a power cable having a thickness of equal to or greater than 1.25 [mm$^2$] (for example, a power cable having a thickness of 1.25 or 2 [mm$^2$]) as the power cable that connects between the power source 501 and the amplifier 511. Similarly, the amplifier 512 is αiPS11-B, and thus it is specified that a thickness of a usable power cable is 8 [mm²]. Therefore, the cable selection unit 22 selects a power cable having a thickness of equal to or greater than 8 [mm²] as the power cable that connects between the power source 501 and the amplifier 512.

Further, the cable selection unit 22 refers to the cable table 400 to specify a thickness of the power cable corresponding to the motors 521 and 522. Then, the cable selection unit 22 selects the specified thickness of the power cable as a thickness of the power cable that connects between the motors 521 and 522 and the amplifier 511. In this example, the motors 521 and 522 are each βiF22/2000-B, and thus it is specified that a thickness of a usable power cable is 1.25 [mm²]. Therefore, the cable selection unit 22 selects a power cable having a thickness of equal to or greater than 1.25 [mm²] as the power cable that connects between the motors 521 and 522 and the amplifier 511. Similarly, the motor 523 is αiI8/8000-B, and thus it is specified that a thickness of a usable power cable is 8 [mm²]. Therefore, the cable selection unit 22 selects a power cable having a thickness of equal to or greater than 8 [mm²] as the power cable that connects between the motor 523 and the amplifier 512.

According to a modification example, the cable selection unit 22 may determine a thickness of a power cable that connects between a power source and an amplifier, based on a sum of power consumption of each motor connected to the amplifier. In this case, a table representing a relationship between a combination of motors and a thickness of a power cable is used as a cable table.

Figure 6:
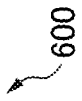
FIG. 6 is a diagram illustrating one example of a cable table representing a relationship between a combination of motors and a power cable according to a modification example.

FIG. 6 is a diagram illustrating one example of a cable table representing a relationship between a combination of motors and a thickness of a power cable according to the modification example. A cable table 600 illustrated in FIG. 6 indicates, for each thickness of a power cable, a combination of motors corresponding to the thickness. For example, in the cable table 600, for each combination of the motors, a thickness of a power cable that can transmit power corresponding to a sum of power consumption of the combination of motors is associated with the combination. Therefore, the cable selection unit 22 refers to the cable table 600 to specify, for each amplifier included in a selected combination of amplifiers, a thickness of a power cable associated with a combination of motors connected to the amplifier. In this way, the cable selection unit 22 can select, for each amplifier, a thickness of a power cable used for connecting between the amplifier and a power source in such a way as to satisfy a power supply to each motor connected to the amplifier.

For example, FIG. 5 is referred again. In the system 500 illustrated in FIG. 5, it is assumed that both of the two motors 521 and 522 connected to the amplifier 511 are βiS1/6000-B. In this case, by referring to the cable table 600, it is specified that a thickness of a power cable usable for a combination of two motors of βiS1/6000-B is 1 [mm²]. Therefore, the cable selection unit 22 may select a power cable having a thickness of equal to or greater than 1 [mm²] as the power cable that connects between the power source 501 and the amplifier 511.

According to the modification example, when a total of power consumption of an individual motor connected to an amplifier is smaller than an amplifier capacity of the amplifier, the cable selection unit 22 can select a power cable whose thickness is thinner than a thickness of a power cable corresponding to the amplifier capacity as the power cable that connects between the amplifier and a power source. As a result, an acquisition cost of the power cable can be reduced. In other words, the cable selection unit 22 can select a more appropriate power cable corresponding to a combination of motors connected to an amplifier.

Still another modification example, the memory 14 may store, for each thickness of a power cable, a cable table representing a relationship with a total of power consumption of a motor corresponding to the thickness in advance. In this case, the cable selection unit 22 may refer to the cable table for each amplifier included in a selected combination of amplifiers, to specify a thickness of a power cable corresponding to a total of power consumption of an individual motor connected to the amplifier, and may select a power cable having the specified thickness or a thickness greater than the specified thickness. In this way, the cable selection unit 22 can select the thickness of the power cable used for connecting between the amplifier and a power source in such a way as to satisfy a power supply to each motor connected to the amplifier. In this case also, when the total of the power consumption of the individual motor connected to the amplifier is smaller than an amplifier capacity of the amplifier, the cable selection unit 22 can select a power cable whose thickness is thinner than a thickness of a power cable corresponding to the amplifier capacity as the power cable that connects between the amplifier and the power source.

Note that specifications of a selected power cable are not limited to a thickness of the power cable. Specifications of a power cable may be, for example, a continuous rated current value or a combination of a thickness and a continuous rated current value. In this case, each of the cable tables described above may represent a physical characteristic value (for example, a continuous rated current value) or a combination of physical characteristic values (for example, a combination of a thickness and a continuous rated current value) corresponding to the specifications to be selected instead of a thickness of a power cable. Then, similarly to the embodiment or the modification example described above, the cable selection unit 22 may refer to the cable table, and select specifications of a power cable that connects between an amplifier and a power source and specifications of a power cable that connects between a motor and an amplifier.

The cable selection unit 22 notifies the tool selection unit 23 and the display control unit 24 of all the selected specifications of the power cables.

The tool selection unit 23 selects one or more tools for processing the power cables of all the selected specifications (for example, a crimp tool or a wire stripper). In the present embodiment, the tool selection unit 23 refers to a tool table, and selects to one or more tools in such a way that a power cable of selected individual specifications can be processed with any tool.

Figure 7:
FIG. 7 is a diagram illustrating one example of a tool table.

FIG. 7 is a diagram illustrating one example of a tool table. A tool table 700 illustrated in FIG. 7 indicates, for each selectable tool, a thickness of a power cable that can be processed with the tool. For example, it is indicated that a tool A can process a power cable having a thickness of 0.75 [mm²] and a power cable having a thickness of 1.25 [mm²]. Further, it is indicated that a tool B can process a power cable having a thickness of 1.25 [mm²] and a power cable having a thickness of 2 [mm²].

For example, the tool selection unit 23 selects one or more tools in such a way that the number of selected tools is minimum. Alternatively, the tool selection unit 23 may select one or more tools in such a way that the number of tools already possessed by a user is maximum. In this case, possessed tool information representing a tool possessed by a user among selectable tools is stored in the memory 14 in advance. Then, the tool selection unit 23 may refer to the possessed tool information together with the tool table, and select one or more tools. Still alternatively, the tool selection unit 23 may select one or more tools in such a way that a total of an acquisition cost of one or more tools to be selected is minimum. In this case, tool cost information representing an acquisition cost for each selectable tool is stored in the memory 14 in advance. Then, the tool selection unit 23 may refer to the tool cost information together with the tool table, and select one or more tools.

In order to select one or more tools as described above, for example, the tool selection unit 23 may select each tool in accordance with a round-robin algorithm, or may select each tool in accordance with any of various optimization techniques used for optimizing a combination, such as dynamic programming or a genetic algorithm, for example.

The tool selection unit 23 notifies the display control unit 24 of information representing each selected tool.

The display control unit 24 causes the display device 12 to display information representing a selected combination of amplifiers, specifications of a power cable that connects between an individual amplifier included in the combination and a power source (for example, a thickness or a continuous rated current value), and specifications of a power cable that connects between an individual motor and the amplifier. At this time, the display control unit 24 may cause the display device 12 to display, in a list form, for each amplifier, a combination of motors connected to the amplifier, specifications of a power cable between the amplifier and a power source, and specifications of a power cable between an individual motor connected to the amplifier and the amplifier, for example. Alternatively, the display control unit 24 may generate another display form, for example, an image representing a connection relationship between a selected combination of amplifiers and an individual motor included in the combination, and cause the display device 12 to display the generated image. At this time, the display control unit 24 may represent, for each amplifier, a name of the amplifier together with a shape representing the amplifier (for example, a rectangle) in the image, and represent, for each motor, a name of the motor together with a shape representing the motor (for example, a circle). Furthermore, the display control unit 24 may represent specifications of a power cable that connects any of the amplifiers and a power source near a shape representing the power cable (for example, a line) in the image. Similarly, the display control unit 24 may represent specifications of a power cable that connects any of the motors and the amplifier near a shape representing the power cable (for example, a line) in the image. Note that sizes, colors, or brightness of a shape representing a power cable may vary according to specifications of the power cable. For example, a thicker power cable may be represented by a thicker line representing the power cable.

Furthermore, the display control unit 24 causes the display device 12 to display information representing each selected tool, for example, a name of each of the tools.

Figure 8:
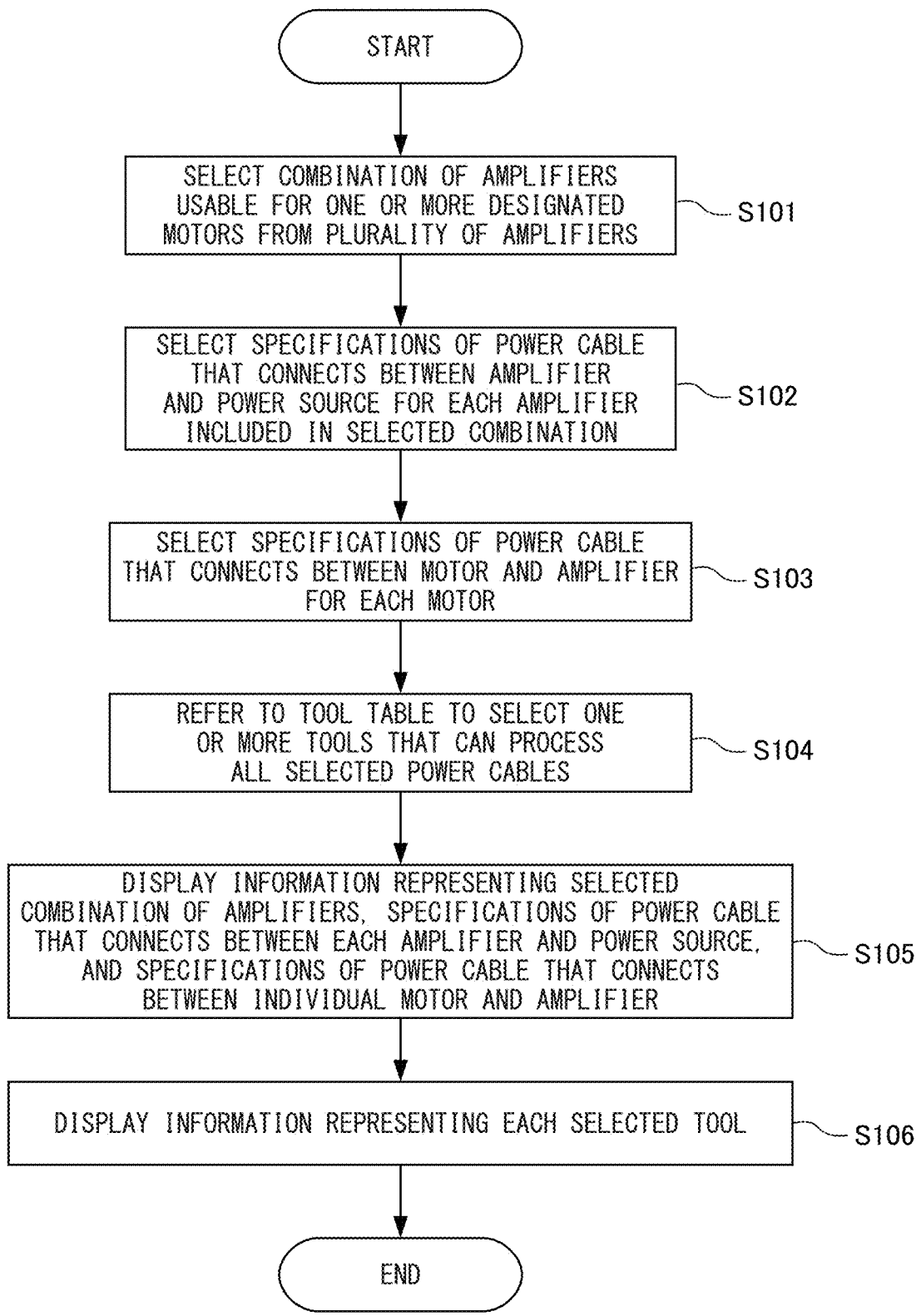
FIG. 8 is an operation flowchart of cable selection processing.

FIG. 8 is an operation flowchart of cable selection processing. The processor 15 executes the cable selection processing according to the following operation flowchart.

The amplifier selection unit 21 of the processor 15 selects, from a plurality of amplifiers, a combination of amplifiers usable for supplying power to one or more designated motors in accordance with the number of motors and specifications of an individual motor designated by used motor information and specifications of each amplifier (step S101).

The cable selection unit 22 of the processor 15 selects, for the individual amplifier included in the selected combination of the amplifiers, specifications of a power cable used for connecting between the amplifier and a power source (step S102). Furthermore, the cable selection unit 22 selects, for each motor, specifications of a power cable used for connecting between the motor and the corresponding amplifier (step S103).

The tool selection unit 23 of the processor 15 refers to the tool table, to select one or more tools that can process all the selected power cables (step S104).

The display control unit 24 of the processor 15 causes the display device 12 to display information representing the selected combination of the amplifiers, the specifications of the power cable that connects between the individual amplifier included in the combination and the power source, and the specifications of the power cable that connects between the individual motor and the corresponding amplifier (step S105). Furthermore, the display control unit 24 causes the display device 12 to display information representing each of the selected tools (step S106). Then, the processor 15 ends the cable selection processing.

As described above, the cable selection device according to one example of a servo amplifier selection device selects a combination of amplifiers to which each motor is connected, based on the number of motors used for constructing a desired system for driving a motor, specifications of an individual motor, and specifications of a plurality of usable amplifiers. The cable selection device further selects, based on a selection result, specifications of a power cable used for connecting between an individual amplifier included in the combination of the amplifiers and a power source and specifications of a power cable used for connecting between an individual motor and the corresponding amplifier. Thus, the cable selection device can automatically select a power cable appropriate in the desired system. Furthermore, the cable selection device can automatically select one or more tools that can process each of the selected power cables. Then, the cable selection device can notify a user of the selected individual amplifier, the specifications of the individual power cable, and the one or more tools. Therefore, the cable selection device can greatly reduce a man-hour required for preparing a power cable and a tool.

Note that, when a selection of a tool is not necessary, the processing of the tool selection unit 23 may be omitted. In this case, the processing in step S104 and step S106 in the cable selection processing illustrated in FIG. 8 is omitted. Further, when specifications of a power cable that connects between each motor and the corresponding amplifier do not need to be selected, the processing in step S103 in the cable selection processing may be omitted.

Further, the display control unit 24 may cause the display device 12 to display only any of a selected combination of amplifiers, specifications of a selected individual power cable, and a selected tool. For example, the display control unit 24 may cause the display device 12 to display only a thickness of a selected individual power cable. Alternatively, when information representing a selected combination of amplifiers, a thickness of a selected individual power cable, and a selected tool is output to another instrument via the communication interface 13 or is stored in the memory 14, the processing of the display control unit 24 may be omitted. In this case, the processing in step S105 and step S106 in the cable selection processing illustrated in FIG. 8 is omitted.

Further, a computer program that achieves a function of each unit of the processor 15 of the cable selection device 1 according to the embodiment or the modification example described above may be provided in form of being recorded in a computer-readable portable recording medium, such as a semiconductor memory, a magnetic recording medium, or an optical recording medium.

All examples and conditional language recited herein are intended to have teaching purpose to aid the reader in understanding the concepts contributed by the inventor to the present invention and furthering the art, and are to be construed as being without limitation to such specifically recited examples and conditions nor does the organization of such examples in the specification related to showing of the superiority and inferiority of the invention. Although the embodiment of the present invention is described in detail, it is to be understood that various changes, substitutions, and modifications can be made hereto without departing from the spirit and scope of the invention.

What is claimed is:

1. A servo amplifier selection device, comprising:
    a memory configured to store specifications of each of a plurality of amplifiers capable of supplying power to a motor;
    a processor configured to
        select, based on the number of one or more designated motors, specifications of each of the one or more motors, and the specifications of each of the plurality of amplifiers, a combination of amplifiers connected to the one or more designated motors from the plurality of amplifiers in such a way that each of the one or more designated motors is connected to any of the plurality of amplifiers; and
        select, for each amplifier included in the combination of the amplifiers, specifications of a power cable that connects between the amplifier and a power source in such a way as to satisfy a supply of power needed for the motor connected to the amplifier among the one or more designated motors.

2. The servo amplifier selection device according to claim 1, wherein
    the memory further stores a first table representing, for each of the plurality of amplifiers, specifications of a power cable usable for supplying power to the amplifier, and
        the processor selects, for each amplifier included in the combination of the amplifiers, the specifications of the power cable that connects between the amplifier and the power source by referring to first table.

3. The servo amplifier selection device according to claim 1, wherein
    the memory further stores a second table representing, for each of specifications of the power cable, a combination of motors corresponding to the specifications, and
    the processor selects, for each amplifier included in the combination of the amplifiers, as specifications of the power cable that connects between the amplifier and the power source, specifications of a power cable corresponding to a combination of motors connected to the amplifier among the one or more designated motors by referring to the second table.

4. The servo amplifier selection device according to claim 1, wherein
    the memory further stores a third table representing, for each of specifications of the power cable, a maximum value of power consumption corresponding to the specifications, and
    the processor selects, for each amplifier included in the combination of the amplifiers, as specifications of the power cable that connects between the amplifier and the power source, specifications of a power cable in which a sum of power consumption of each motor connected to the amplifier among the one or more designated motors is equal to or less than a maximum value of the power consumption by referring to the third table.

5. The servo amplifier selection device according to claim 1, wherein
    the memory further stores a fourth table representing, for each of the one or more designated motors, specifications of a power cable usable for supplying power to the motor, and
    the processor is further configured to select, for each of the one or more motors, specifications of a power cable that connects between the motor and an amplifier to which the motor is connected in the combination of the amplifiers by referring to the fourth table.

6. The servo amplifier selection device according to claim 5, wherein
    the memory further stores a tool table representing, for each of a plurality of tools capable of processing a power cable, specifications of a power cable that can be processed by the tool; and
    the processor is further configured to select, from the plurality of tools, one or more tools for processing each of a power cable having specifications selected, for each amplifier included in the combination of the amplifiers, for connecting between the amplifier and the power source and a power cable having specifications selected, for each of the one or more motors, for connecting between the motor and any amplifier included in the combination of the amplifiers.

7. A non-transitory recording medium that stores a servo amplifier selection computer program for causing a computer to execute:
    selecting, based on the number of one or more designated motors, specifications of each of the one or designated more motors, and specifications of each of a plurality of amplifiers capable of supplying power to the one or more designated motors being stored in a memory, a combination of amplifiers connected to the one or more designated motors from the plurality of amplifiers in such a way that each of the one or more designated motors is connected to any of the plurality of amplifiers; and
    selecting, for each amplifier included in the combination of the amplifiers, specifications of a power cable that connects between the amplifier and a power source in such a way as to satisfy a supply of power needed for the motor connected to the amplifier among the one or more designated motors.

* * * * *